DESIGN.

J. L. WHITING.

Paint-Brushes.

No. 5,990.

Reissued July 28, 1874.

Witnesses.
C. H. Brown.
M. Church

Inventor
J. L. Whiting
by his Attys.
Hill & Greenwalt

UNITED STATES PATENT OFFICE.

JOHN L. WHITING, OF BOSTON, MASSACHUSETTS.

DESIGN FOR PAINT-BRUSHES.

Specification forming part of Design No. 4,718, dated March 14, 1871; reissue No. 5,990, dated July 28, 1874; application filed July 3, 1874.

*To all whom it may concern:*

Be it known that I, JOHN L. WHITING, of Boston, in the county of Suffolk and State of Massachusetts, have invented a new and Improved Design for a Paint-Brush; and I do hereby declare the following to be a full and exact description of the same, reference being had to the accompanying drawings forming part of this specification, in which—

Figure 1:
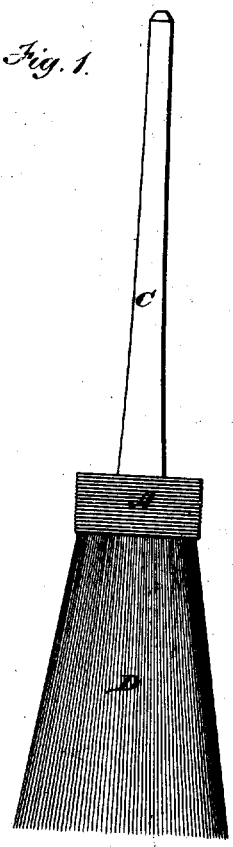
Figure 2:
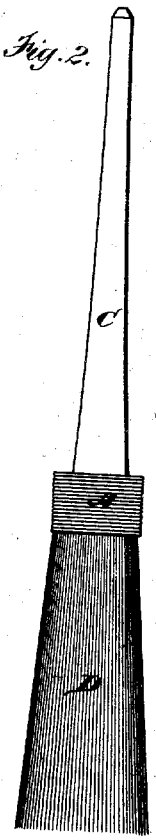
Figure 3:
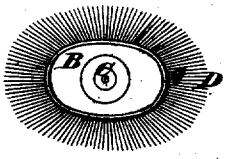

Figure 1 is a front view, Fig. 2 a side elevation, and Fig. 3 a top view, of a brush made in accordance with such design.

Similar letters of reference in the accompanying drawings denote the same parts.

So far as my design applies to the brush or head, as distinguished from the handle, it is characterized by an oval or elliptical ferrule, A, an oval or elliptical head, B, made to fit into the upper end of such ferrule, and a mass, D, of bristles, oval or elliptical in transverse section, and tapered relatively to the ferrule in manner as represented in the drawing.

The handle G is characterized by tapering from the head of the brush.

The brush is suitable for varnishing, sizing, or dusting.

I claim—

1. The design, substantially as described, for the body of the paint-brush, consisting of the head, ferrule, and mass of bristles, arranged in the form and design as set forth.

2. The design, substantially as described, for a paint-brush, composed of head, ferrule, bristles, and tapering handle, arranged in the form and design as set forth.

JOHN L. WHITING.

Witnesses:
GEO. D. NOYES,
OLIVER STEVENS.